United States Patent
Lee

(10) Patent No.: US 6,666,972 B2
(45) Date of Patent: Dec. 23, 2003

(54) METHOD FOR TREATING WASTEWATER CONTAINING HEAVY METALS WITH USED IRON OXIDE CATALYST

(75) Inventor: Hyo-Sook Lee, Taejon (KR)

(73) Assignee: Korea Institute of Geoscience and Mineral Research, Taejon (KR)

( * ) Notice: Subject to any disclaimer, the term of this patent is extended or adjusted under 35 U.S.C. 154(b) by 64 days.

(21) Appl. No.: 10/117,180

(22) Filed: Apr. 8, 2002

(65) Prior Publication Data

US 2003/0029803 A1 Feb. 13, 2003

(30) Foreign Application Priority Data

Apr. 16, 2001 (KR) .............................................. 01-20125

(51) Int. Cl.[7] .............................. B01D 35/06; C02F 1/48; C02F 1/52; C02F 1/72
(52) U.S. Cl. ........................ 210/695; 210/722; 210/724; 210/738; 210/758; 210/763; 210/912
(58) Field of Search .................................. 210/695, 722, 210/724, 738, 757, 758, 763, 912, 208

(56) References Cited

U.S. PATENT DOCUMENTS 5,620,610 A * 4/1997 Ishii et al. .................. 210/763
6,238,571 B1 * 5/2001 Olmez et al. ............... 210/722

* cited by examiner

*Primary Examiner*—David A. Reifsnyder
(74) *Attorney, Agent, or Firm*—Arent Fox Kintner Plotkin & Kahn

(57) ABSTRACT

The present invention is to provide a method for treating a wastewater containing heavy metals using a used iron oxide catalyst, which is to treat an acidic wastewater having a pH value of about 1.0 and containing Cu, Fe, Ni, Cr or Zn, the method including: adding the used iron oxide catalyst containing at least 70% magnetite ($Fe_3O_4$) to the wastewater at a weight ratio of 1:0.05; stirring the wastewater mixed with the iron oxide catalyst at a speed of 60 rpm for 15 minutes in a stirrer; and subjecting the wastewater to solid-liquid separation using a magnet for adsorption and removal of the heavy metals.

1 Claim, No Drawings

METHOD FOR TREATING WASTEWATER CONTAINING HEAVY METALS WITH USED IRON OXIDE CATALYST

BACKGROUND OF THE INVENTION

1. Field of the Invention

The present invention relates to a method for treating a wastewater containing heavy metals with a used iron oxide catalyst. More particularly, the present invention related to a method for treating a wastewater containing heavy metals with an iron oxide catalyst, in which the heavy metals contained in the wastewater are adsorbed and removed by the iron oxide catalyst used for synthesis of styrene monomer.

2. Background of the Related Art

Styrene monomer used as a material of polymer in the petrochemical industry is prepared from ethyl benzene in the presence of an iron oxide catalyst, which uses ferric oxide ($Fe_2O_3$) as a principal material and contains alkali metals and alkali earth metals in order to enhance its catalytic activity. The synthesis of styrene monomer using the iron oxide catalyst involves a dehydrogenation reaction in which hydrogen is generated to reduce ferric oxide ($Fe_2O_3$) to magnetite ($Fe_3O_4$). So the lifetime of the catalyst is normally no more than one or two years.

The used iron oxide catalyst is handed over to a special waste treatment agent and buried in the ground at a treatment expense. More than about 70 percents of the used catalyst is magnetite ($Fe_3O_4$).

In the treatment of a wastewater containing heavy metals such as metal plating wastewater or mine backwater, the suspended materials are directly subjected to solid-liquid separation. But the elimination of the heavy metals from the wastewater involves conversion of the heavy metals to cations susceptible to precipitation by oxidation or reduction; neutralization of heavy metal cations and precipitation by double decomposition; adsorption (mercury); ion-exchange method; or reverse osmosis. The widely used method is to neutralization-precipitate the wastewater containing heavy metals with calcium hydroxide (hydrated lime).

However, the neutralization-precipitation of the wastewater with calcium hydroxide produces sludge after filtration and requires it to be buried as a Class 2 waste. The sludge containing water by more than 80 percents is of great bulk and generates seepage water when buried in the ground, thereby causing environmental problems such as soil contamination and increasing the expense for wastewater treatment.

SUMMARY OF THE INVENTION

Accordingly, the present invention is directed to a method for treating a wastewater containing heavy metals with a used iron oxide catalyst that substantially obviates one or more problems due to limitations and disadvantages of the related art.

An object of the present invention is to provide a method for treating a wastewater containing heavy metals with a used iron oxide catalyst in a manner that applies a strongly magnetic iron oxide catalyst used in the synthesis process of styrene monomer to a wastewater containing heavy metals such as metal plating wastewater or mine backwater to neutralize the wastewater and adsorb the heavy metals contained in the wastewater.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

To achieve these objects and other advantages and in accordance with the purpose of the invention, as embodied and broadly described herein, a method for treating a wastewater containing heavy metals using a used iron oxide catalyst, which is to treat an acidic wastewater having a pH value of about 1.0 and containing Cu, Fe, Ni, Cr or Zn, includes: (a) adding the used iron oxide catalyst containing magnetite ($Fe_3O_4$) with at least 70% to the wastewater at a weight ratio of 1:0.05; (b) stirring the wastewater mixed with the iron oxide catalyst at a speed of 60 rpm for 15 minutes in a stirrer; and (c) subjecting the wastewater to solid-liquid separation using a magnet for adsorption and removal of the heavy metals.

The present invention is to adsorb/eliminate heavy metals contained in the wastewater, such as Cu, Fe, Ni, Cr or Zn using a used iron oxide catalyst and includes adding the used iron oxide catalyst to the wastewater at a predetermined weight ratio, stirring the mixture and subjecting the wastewater to solid-liquid separation using a magnet.

The iron oxide catalyst is a special waste to be buried in the ground after its use in the preparation of styrene monomer from ethyl benzene and contains magnetite ($Fe_3O_4$) with 70 percents and additionally alkali metals and alkali earth metals. The alkali metals and the alkali earth metals contained in the used catalyst are very soluble in water to show a strong alkalinity and thus neutralize an acidic wastewater such as metal plating wastewater or mine backwater. Also the iron oxide particles such as $Fe_2O_3$ or $Fe_3O_4$ adsorb heavy metals.

Namely, the used iron oxide catalyst containing magnetite ($Fe_3O_4$) as a principal component is so strongly magnetic as to adsorb heavy metal ions precipitated in the neutral state and to allow solid-liquid separation of the wastewater, thereby neutralizing the wastewater with the alkali metals and the alkali earth metals.

Accordingly, the present invention involves adding, based on the total weight of the wastewater, 5 wt. % of a used iron oxide catalyst powder to the wastewater containing Cu, Fe, Ni, Cr or Zn, stirring the mixture at 60 rpm for about 15 minutes and subjecting the wastewater to solid-liquid separation using a magnet.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENT

Reference will now be made in detail to the preferred embodiments of the present invention.

EXAMPLE 1

Synthetic wastewater containing each 200 mg/l of Cu, Fe, Ni, Cr or Zn ion were prepared, and each 1 l of them were controlled to have a pH value of 1.0 to 2.0. Adding 50 g of a used iron oxide catalyst to each synthetic wastewater of a predetermined pH value, the mixture was stirred at 60 rpm for 15 minutes with a stirrer and removed of sludge with a magnet. The filtrate was collected to analyze the content of each heavy metal. The results are presented in Table 1.

TABLE 1

|  | Cu | Fe | Ni | Zn | Total Cr |
| --- | --- | --- | --- | --- | --- |
| Concentration (mg/l) of Filtrate After Treatment | 0.05 | 0.10 | 0.01 | 0.02 | 0.02 |
| Removal Rate (%) | 99.97 | 99.95 | 99.99 | 99.99 | 99.99 |

EXAMPLE 2

Synthetic wastewater containing each 500 mg/l of Cu, Fe, Ni, Cr or Zn ion were prepared, and each 1 l of them were controlled to have a pH value of 1.0 to 2.0. Adding 50 g of a used iron oxide catalyst to each synthetic wastewater of a predetermined pH value, the mixture was stirred at 60 rpm for 15 minutes with a stirrer and removed of sludge with a magnet. The filtrate was collected to analyze the content of each heavy metal. The results are presented in Table 2.

TABLE 2

|  | Cu | Fe | Ni | Zn | Total Cr |
| --- | --- | --- | --- | --- | --- |
| Concentration (mg/l) of Filtrate After Treatment | 0.10 | 0.10 | 0.05 | 0.10 | 0.05 |
| Removal Rate (%) | 99.98 | 99.98 | 99.99 | 99.98 | 99.99 |

EXAMPLE 3

Calcium hydroxide used as a heavy metal precipitator was added to 1 l of a synthetic wastewater containing 200 mg/l of Zn ion and having a pH value of 2.0 to control the pH value of the wastewater to 10.0. The wastewater was added to a 1 l cylinder and measure in regard to the volume and the sedimentation velocity of the sludge. The water content of the sludge was also measured. On the other hand, 50 g of a used iron oxide catalyst was added to 1 l of a synthetic wastewater containing 200 mg/l of Zn ion and having a pH value of 2.0. The mixture was stirred for 15 minutes and added to a 1 l cylinder. Subsequently, the volume and the sedimentation velocity of the sludge were measured and compared with those of the sludge in the wastewater treated with calcium hydroxide. The results are presented in Table 3.

TABLE 3

| Type of Heavy Metal Remover | Calcium Hydroxide | Used Iron Oxide Catalyst |
| --- | --- | --- |
| Volume of Sludge (cm$^3$) | 125 | 39 |
| Water Content of Sludge (%) | 81 | 27 |
| Sedimentation Velocity of Sludge (cm$^3$/min) | 275 | 250 |
| Sedimentation Velocity of Sludge When Using Magnet (cm$^3$/min) | 275 | 420 |

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

As described above, the present invention applies an iron oxide catalyst used in the synthesis of styrene monomer to an acidic wastewater containing heavy metals to adsorb the heavy metals, with a strong recycling effect, and uses a magnet instead of performing filtration to shorten the time for solid-liquid separation and, compared with the case of using calcium hydroxide as a precipitator, to reduce the volume and the water content of the precipitate of the heavy metal ions, i.e., sludge, thereby lowering the expense of sludge re-treatment.

What is claimed is:

1. A method for treating a wastewater containing heavy metals using a used iron oxide catalyst, which is to treat an acidic wastewater having a pH value of about 1.0 and containing Cu, Fe, Ni, Cr or Zn, the method comprising:

adding the used iron oxide catalyst containing at least 70% magnetite ($Fe_3O_4$) to the wastewater at a weight ratio of 1:0.05;

stirring the wastewater mixed with the iron oxide catalyst at a speed of 60 rpm for 15 minutes in a stirrer; and subjecting the wastewater to solid-liquid separation using a magnet for adsorption and removal of the heavy metals.

* * * * *

UNITED STATES PATENT AND TRADEMARK OFFICE
CERTIFICATE OF CORRECTION

PATENT NO. : 6,666,972 B2
DATED : December 23, 2003
INVENTOR(S) : Hyo-Sook Lee

It is certified that error appears in the above-identified patent and that said Letters Patent is hereby corrected as shown below:

Title page,
Item [73], Assignee, please change to read as follows:
-- Korea Institute of Geoscience and Mineral Resources --.

Signed and Sealed this

Sixth Day of September, 2005

JON W. DUDAS
*Director of the United States Patent and Trademark Office*